UNITED STATES PATENT OFFICE 2,669,570

PRODUCTION OF N-VINYL PYRROLIDONE

Arthur W. Schnizer, Corpus Christi, Tex., assignor to Celanese Corporation of America, New York, N. Y., a corporation of Delaware No Drawing. Application August 24, 1951, Serial No. 243,574

1 Claim. (Cl. 260—326.5)

This invention relates to the production of N-vinylpyrrolidone and relates more particularly to an improved process for the production of N-vinylpyrrolidone by catalytic dehydration processes.

An object of this invention is to provide an efficient and economical process for the production of N-vinylpyrrolidone in high yields from readily available intermediates.

Another object of this invention is the provision of a continuous catalytic dehydration process whereby ethanolamine and gamma-butyrolacton may be reacted to form the intermediate compound N-beta-hydroxyethyl-gamma-hydroxybutyramide, and the latter subjected to dehydration reaction conditions whereby N-vinylpyrrolidone is obtained.

Other objects of this invention will appear from the following detailed description.

N-vinylpyrrolidone is a valuable polymerizable unsaturated heterocyclic compound which yields valuable polymers when subjected to polymerization reactions. The wider utilization of N-vinylpyrrolidone polymers is hampered by the cost of the monomer, and processes for the production of said monomeric compound in a more economical manner have been the object of extensive investigation.

I have now found that N-vinylpyrrolidone may be obtained in excellent yield and purity by an improved process which comprises reacting ethanolamine with gamma-butyrolactone to form N-beta-hydroxyethyl-gamma-hydroxybutyramide and then subjecting the intermediate amide compound thus obtained to dehydration conditions. During the initial step, in the dehydration of said amide compound, water is split off, and a ring closure of the N-beta-hydroxyethyl-gamma-hydroxybutyramide takes place. Thus, with the loss of a single molecule of water N-beta-hydroxyethylpyrrolidone is formed. With the removal of another molecule of water the foregoing heterocyclic alcohol obtained upon ring closure yields N-vinylpyrrolidone. Most advantageously, the ring closure involving the removal of the first molecule of water is effected merely by heating the intermediate N-beta-hydroxyethyl-gamma-hydroxybutyramide. The removal of the second molecule of water is, however, preferably effected by catalytic dehydration processes.

The catalytic dehydration of the N-beta-hydroxyethylpyrrolidone, obtained as a product of the ring closure, may be caried out in either the liquid or vapor phase. When effecting said dehydration in the liquid phase, the N-beta-hydroxyethylpyrrolidone may be passed downwardly through a heated reaction chamber filled with particles of the dehydration catalyst employed and held at a suitable temperature. The reaction chamber may be maintained at a temperature of 200 to 400° C. with optimum results being obtained when the dehydration reaction chamber is maintained at a temperature of from 320 to 350° C.

An alternative procedure for effecting said dehydration in the liquid phase comprises continuously adding the N-beta-hydroxyethylpyrrolidone to an inert liquid such as mineral oil, diphenyl or diphenyl oxide which is maintained at reaction temperature and which contains a dehydration catalyst suspended therein in relatively finely divided form, and then continuously distilling off the N-vinylpyrrolidone formed together with the water of reaction. Preferably, when employing a liquid phase reaction involving the use of an inert liquid, this dehydration step is effected at subatmospheric pressures of 150 to 300 mm. of mercury.

As mentioned above, the dehydration of N-beta-hydroxyethylpyrrolidone to N-vinylpyrrolidone may also be carried out in the vapor phase. Most advantageously, the vapor phase dehydration reaction is carried out at temperatures of 250 to 350° C. and under sub-atmospheric pressures below 100 mm. of mercury. The N-beta-hydroxyethylpyrrolidone is vaporized under the pressures employed and the vapors are passed over a dehydration catalyst held at the desired temperature in a suitable, heated reaction zone. The reaction product obtained is condensed, and the N-vinylpyrrolidone separated from unreacted intermediate.

Any basic or neutral dehydration catalyst may be employed in my novel process for the production of N-vinylpyrrolidone by dehydration operations. As examples of suitable catalysts, there may be mentioned calcium oxide, aluminum oxide, and a mixture of aluminum oxide-iron oxide-potassium hydroxide in the ratio of 93 parts by weight of aluminum oxide, 2 parts by weight of iron oxide and 5 parts by weight of potassium hydroxide. Dehydration catalysts of the phosphoric acid type are undesirable as they cause excessive decomposition.

When carrying out said dehydration reaction in the vapor phase wherein the vapors of the N-beta-hydroxyethylpyrrolidone are passed over the solid dehydration catalyst, hourly vapor space velocities of from 500 to 4000 are satisfactory with optimum results being obtained with hourly space velocities of about 2600. In liquid phase dehydration operations, wherein the intermdiate is passed downward over a solid dehydration catalyst, hourly liquid space velocities of 150 to 300 may be employed. Space velocity is defined as the volume of gas at reaction conditions or liquid passing through a given volume of catalyst space in unit time.

In order further to illustrate the novel process of my invention, but without being limited thereto, the following examples are given:

Example I 61 parts by weight of ethanolamine are mixed with 86 parts by weight of gamma-butyrolactone and reacted by heating the mixture at a temperature of 200 to 250° C. for about 90 minutes. The reaction is continued until about 18 parts by weight of water are distilled off. The product obtained, comprising essentially N-beta-hydroxypyrrolidone, is then passed downwardly over activated alumina particles heated to a temperature of 270 to 290° C. The product obtained is treated to separate the N-vinylpyrrolidone formed, with the latter being obtained in a yield of 26% of theory.

Example II 127 parts by weight of N-beta-hydroxyethylpyrrolidone are vaporized under a subatmospheric pressure of 56 mm. of mercury and passed over an activated alumina dehydration catalyst maintained at a temperature of 300 to 340° C. employing an hourly space velocity of about 2600. The reaction product is condensed and 57 parts by weight of N-vinylpyrrolidone and 24 parts by weight unreacted starting material are separated therefrom, corresponding to a yield of 82% of theory.

Example III 50 parts by weight of activated alumina of 80 to 200 mesh particle size are added to 500 parts by weight of white mineral oil (Nujol), the mixture heated to 330 to 355° C. under a pressure of 216 mm. of mercury and then 32 parts by weight of N-beta-hydroxyethylpyrrolidone are gradually added over the course of 90 minutes. The vapors are condensed and separated into layers and 5.3 parts by weight of N-vinylpyrrolidone and 10.2 parts by weight of unreacted starting material are separated from the lower layer for a yield of 28% of theory.

Example IV 61 parts by weight of ethanolamine and 86 parts by weight of gamma-butyrolactone are heated for 90 minutes at a temperature between 200° C. and 250° C. during which time 18 parts by weight of water distill off. 64 parts by weight of the residue are vaporized by heating under a pressure of 56 mm. of mercury absolute and the vapors passed over pellets of activated alumina maintained in a suitable reactor at a temperature between 290 and 335° C. The vapors are passed over the catalyst at a gaseous space velocity of about 1000. 20 parts by weight N-beta-hydroxyethylpyrrolidone are recovered as unreacted. N-vinylpyrrolidone is recovered in an amount of 23 parts by weight, which is 65% of theory.

It is to be understood that the foregoing detailed description is given merely by way of illustration and that many variations may be made therein without departing from the spirit of my invention.

Having described my invention, what I desire to secure by Letters Patent is:

Process for the production of N-vinyl pyrrolidone which comprises passing vapors of preformed N-beta-hydroxyethyl pyrrolidone at subatmospheric pressure below 100 mm. of mercury over activated alumina at a temperature of 300° to 340° C., said vapors being passed over said alumina at an hourly space velocity of 500 to 4000, and recovering N-vinyl pyrrolidone.

ARTHUR W. SCHNIZER.

References Cited in the file of this patent

UNITED STATES PATENTS

| Number | Name | Date |
|---|---|---|
| 2,267,757 | Schuster | Dec. 30, 1941 |
| 2,515,318 | Schoene | July 18, 1950 |
| 2,532,573 | Salisbury | Dec. 5, 1950 |

OTHER REFERENCES

Chemical Abstracts—vol. 8, p. 126, citing Berichte, 46, pp. 3087–9.